(12) United States Patent
Binder

(10) Patent No.: US 7,508,091 B2
(45) Date of Patent: Mar. 24, 2009

(54) VEHICLE BATTERY PROTECTION DEVICE

(75) Inventor: Steven D. Binder, Los Angeles, CA (US)

(73) Assignee: Abott-Interfast Corporation, Wheeling, IL (US)

( * ) Notice: Subject to any disclaimer, the term of this patent is extended or adjusted under 35 U.S.C. 154(b) by 361 days.

(21) Appl. No.: 11/372,363

(22) Filed: Mar. 8, 2006

(65) Prior Publication Data

US 2006/0214508 A1    Sep. 28, 2006

Related U.S. Application Data

(60) Provisional application No. 60/659,706, filed on Mar. 8, 2005.

(51) Int. Cl.
*H02H 7/18* (2006.01)
(52) U.S. Cl. .................... 307/10.7; 701/29; 361/86; 320/136
(58) Field of Classification Search ............... 307/10.7; 361/92, 86; 320/104, 136; 340/455; 701/29
See application file for complete search history.

(56) References Cited

U.S. PATENT DOCUMENTS

| | | | | |
|---|---|---|---|---|
| 5,200,877 A | * | 4/1993 | Betton et al. | 361/92 |
| 7,116,078 B2 | * | 10/2006 | Colombo et al. | 320/104 |
| 2001/0040441 A1 | * | 11/2001 | Ng et al. | 320/104 |
| 2003/0104899 A1 | * | 6/2003 | Keller | 477/2 |

FOREIGN PATENT DOCUMENTS

| | | | | |
|---|---|---|---|---|
| JP | | 10070844 A | * | 3/1998 |
| WO | WO 2004015839 A1 | | * | 2/2004 |

* cited by examiner

*Primary Examiner*—Albert W Paladini
*Assistant Examiner*—Daniel Cavallari
(74) *Attorney, Agent, or Firm*—Greer, Burns & Crain, Ltd.

(57) ABSTRACT

A battery protection device for preventing vehicle batteries from being drained to the point that the battery cannot start the vehicle includes an electrical meter that measures at least one electrical characteristic of the battery and a microprocessor. The microprocessor compares this measurement to a minimum starter value corresponding to a battery charge level below which the battery will not be able to start the vehicle. If the minimum starter value is equal to or greater than the current measurement from electrical property measuring device, the battery protection device will open a switch, disconnecting the battery. An indicator then notifies the vehicle operator that the device has been actuated and upon his return to the vehicle, the operator will be able to reset the device and start the vehicle or turn off the electrical device that was left on.

11 Claims, 5 Drawing Sheets

VEHICLE BATTERY PROTECTION DEVICE

This patent application is a continuation of U.S. provisional patent application 60/659,706 filed on Mar. 8, 2005.

BACKGROUND OF THE INVENTION

The present invention relates to devices for preventing vehicle batteries from being too depleted when electricity-using features such as headlights or radios are not turned off and are left on after the engine has been shut off. More specifically, the present invention relates to devices that disconnect the electric circuit between the battery and electricity-using components when a change in the electrical properties of the battery corresponding to such circumstances is detected.

In most vehicles, a battery is used to activate a starter motor, which in turn starts the engine. However, if the charge in the battery drops below a certain level, the battery cannot adequately power the starter motor and the vehicle engine will not start as a result.

Such battery failure is frequently caused by the vehicle operator's failure to turn off electricity-using vehicle accessories such as the headlights when the engine is not running.

Accordingly, there is a need for a device that will prevent a vehicle battery from being drained when these accessories are not turned off at the same time as the vehicle engine. There is also a need to be able to reconnect the circuit when the operator returns to the vehicle.

BRIEF SUMMARY OF THE INVENTION

The above-listed objects are met or exceeded by the present battery protection device, which contains an electrical property measuring device that measures at least one electrical characteristic of the battery, and a microprocessor. The microprocessor compares this measurement to a stored minimum starter value corresponding generally to a minimum battery value below which the battery will not be able to initiate the vehicle starter. If the measurement is less than or equal to the minimum starter value the battery protection device will open a switch, breaking the electrical circuit. The device contains an indicator that the switch has been opened and upon his return to the vehicle, the operator can reset the device and then start the vehicle or turn off the electrical device that was left on.

The switch can be closed and the device reset either by a direct physical mechanism, such as a button attached to the unit, or via a radio-frequency device similar to a keychain car alarm activator. The reset mechanism will functionally reconnect the battery to the machine's electrical system, enabling the user to restart their machine with the remaining charge in the battery. The battery protection device safeguards the remaining charge within the battery where, in the past, under similar circumstances, the vehicle operator would have been left with a "dead" battery, unable to restart without outside intervention.

The battery protection device can be a stand-alone, aftermarket unit placed in electrical series between the battery and the vehicle's starting unit or attached to one of the battery terminals, or, alternatively, the device could be the contained within the vehicle battery itself.

DETAILED DESCRIPTION OF THE INVENTION

Figure 1:
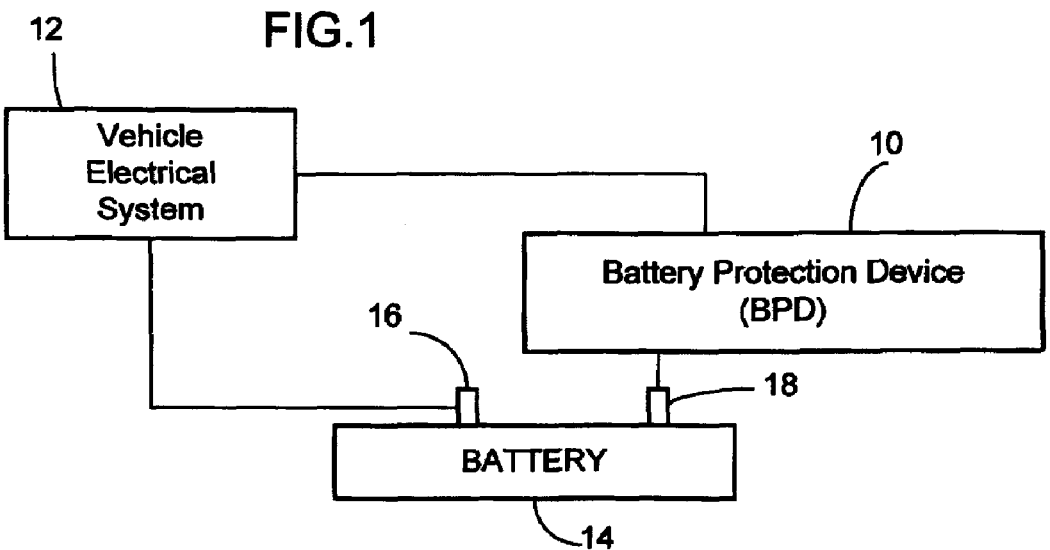
FIG. 1 is a diagram of a first embodiment of the invention, where the invention is an aftermarket device that is wired in series between the vehicle battery and the starter.
Figure 2:
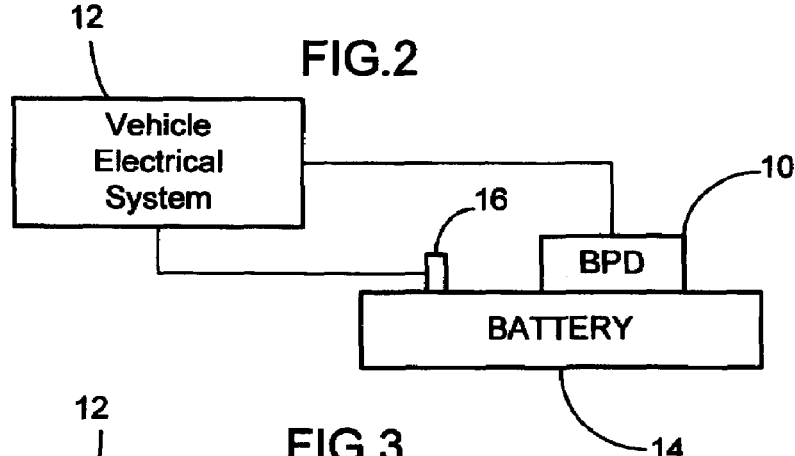
FIG. 2 is a diagram of a second embodiment of the invention, where the invention is an aftermarket device that is wired in series between the vehicle battery and the starter and is attached directly to a battery terminal.
Figure 3:
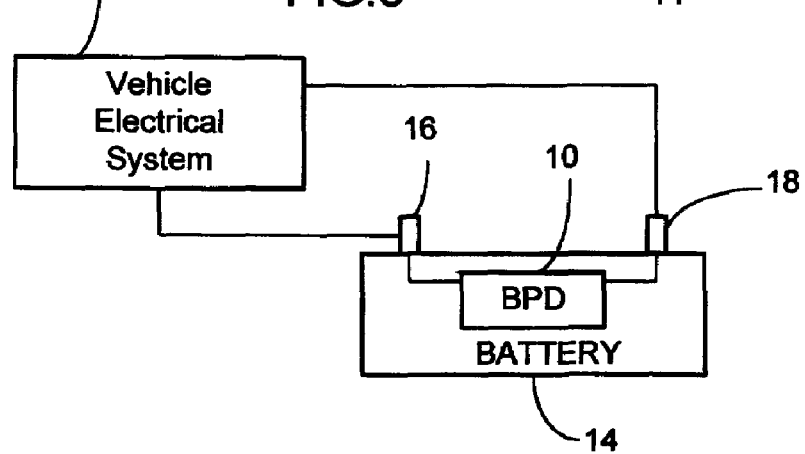
FIG. 3 is a diagram of a third embodiment of the invention, where the battery protection device is manufactured as part of the battery.

FIGS. 1-3 show various embodiments of the battery protection device (BPD) of the present invention. FIG. 1 shows an embodiment of the invention where the battery protection device 10 is an aftermarket unit that can be attached anywhere in electrical series between a vehicle starter and accessories (collectively, the vehicle electrical system) 12 and a vehicle battery 14, which has terminals 16 and 18. The vehicle battery 14 is in a vehicle having a combustion engine and the vehicle starter is used to start the combustion engine using energy stored in the battery 14. FIG. 2 shows an alternate embodiment, where the device 10 is attached to battery terminal 18 on battery 14. FIG. 3 is a third embodiment, where the device 10 is contained within battery 14.

Figure 4:
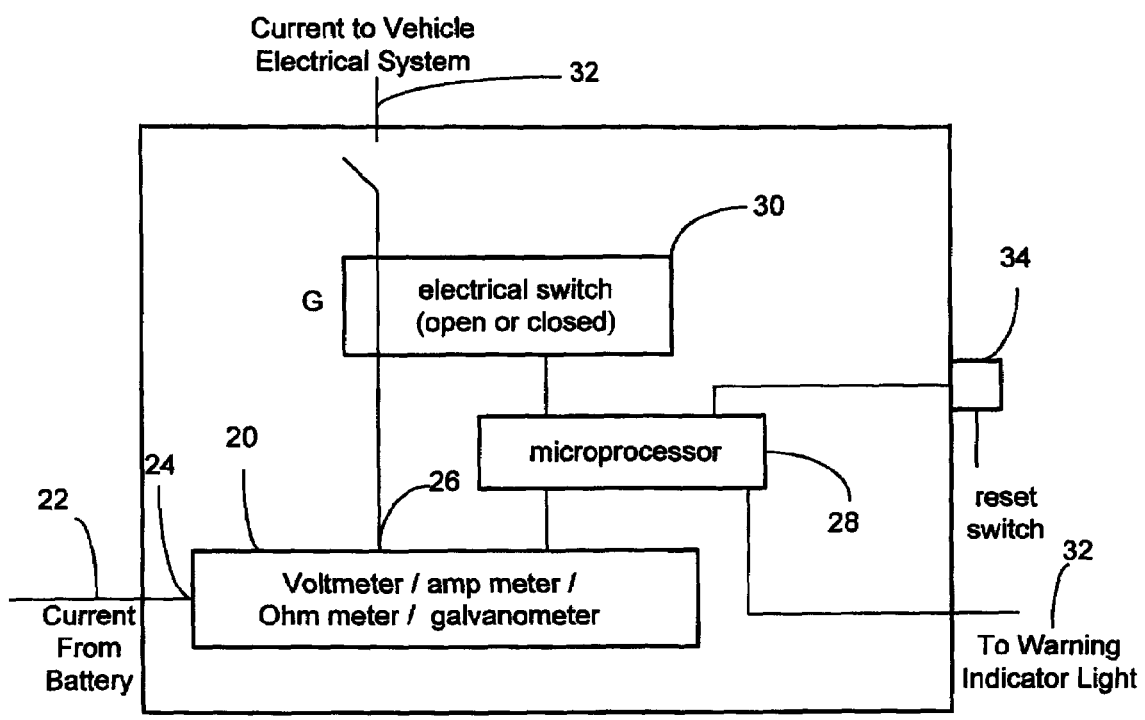
FIG. 4 is a diagram of the battery protection device of the present invention.

Referring to FIG. 4, the battery protection device 10 is attached in series between the vehicle electrical system 12 and the vehicle battery 14. The device 10 contains at least one electrical property measuring device 20 such as an ammeter, ohmmeter, voltmeter, or galvanometer which measures the amperage, voltage and other such metrics of the electricity passing through device 10.

The current from the battery 14 flows into the battery protection device 10 at a first device terminal 22. Electrical property measuring device 20 receives battery current from terminal 22 at an input end 24. The current passes through output end 26 between first device terminal 20 and switch 30. The device 20 measures the strength of the battery's current and/or capacity of the battery, e.g., voltage. This measurement is input to a microprocessor 28 that is constantly assessing the continued ability of the battery 10 to power the vehicle's electrical starter 12.

When the microprocessor 28 determines that a decreasing battery charge is approaching a minimum starter value required to power the electrical starter, the microprocessor will actuate electrical switch 30 to open, thereby breaking the electrical system's circuit between first terminal 22 and second terminal 36, which terminates the energy drain on the battery 10 and preserves enough charge to start the engine at a later time.

When the user returns to the vehicle, he will be informed either by the failure of the vehicle to start or via a warning indicator light 32 that something in the vehicle was draining the battery 10. The user can then eliminate the load on the battery 10 by turning off the electricity-using component, and then toggle a reset button 34, closing switch 30 and restoring current flow to the starter 12, when activated by the user.

Figure 5:
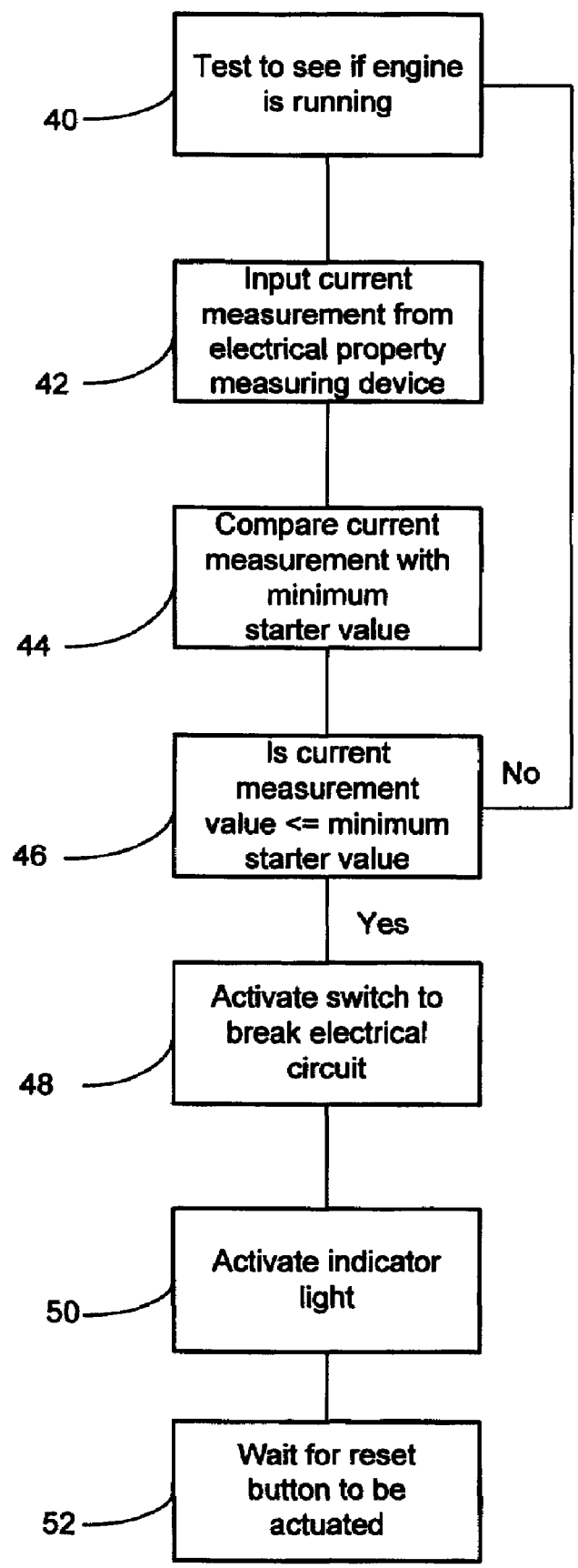
FIG. 5 is a flowchart indicating the operation of the battery protection device of FIG. 4.

Turning now to FIG. 5, at step 40 the microprocessor 28 first checks to see if the engine is running. While this step can be omitted, it is desirable to ensure that the device 10 does not impede the vehicle from normal operation under unusual conditions. At step 42, the microprocessor 28 inputs the measurements generated by electric measuring device 20 and compares the measurements with a previously stored minimum starter value at step 44.

At step 46, the microprocessor 28 compares the readings to a minimum starter value corresponding to the charge necessary to start the engine of the vehicle. This minimum starter value can either be preprogrammed in the microprocessor 28, or microprocessor can include an adaptive algorithm that measures the charge necessary to initiate the starter 12, by using measuring device 22 to determine the average load starter draws when starting the vehicle, and adding a safety margin to this measured value to account for thermal or other variations in battery charge, to establish a minimum starter value.

If the current measurement is greater than minimum charge value, microprocessor 28 cycles back to step 40. However, if the current measurement value is equal to or less than the minimum starter value, microprocessor 28 goes to step 48, which will actuate switch 28, breaking the electrical circuit between first terminal 22 and second terminal 36. If this occurs, indicator 32 will be illuminated by power source 38 (FIG. 6) at step 50. Indicator 32 can either be located on the device 10 itself under the hood, or alternatively, it could be wired into the dashboard, or may be on an external radio-frequency remote control switch.

Switch 30 in battery protection device 10 will remain open until reset button 34 is actuated, closing switch 30. Reset button 34 can either be a physical button on the device 10, or it could be a switch on the dashboard of the vehicle wired to the device 10. Alternatively reset button 34 could be a device attached to a external remote.

In the alternate embodiment shown in FIG. 3, the measuring device 22 is attached to terminals 16 and 18 within battery 14 and measures the voltage difference between them. If a low voltage situation is detected, a switch will break the connection between terminal 18 and the battery 14.

Figure 6:
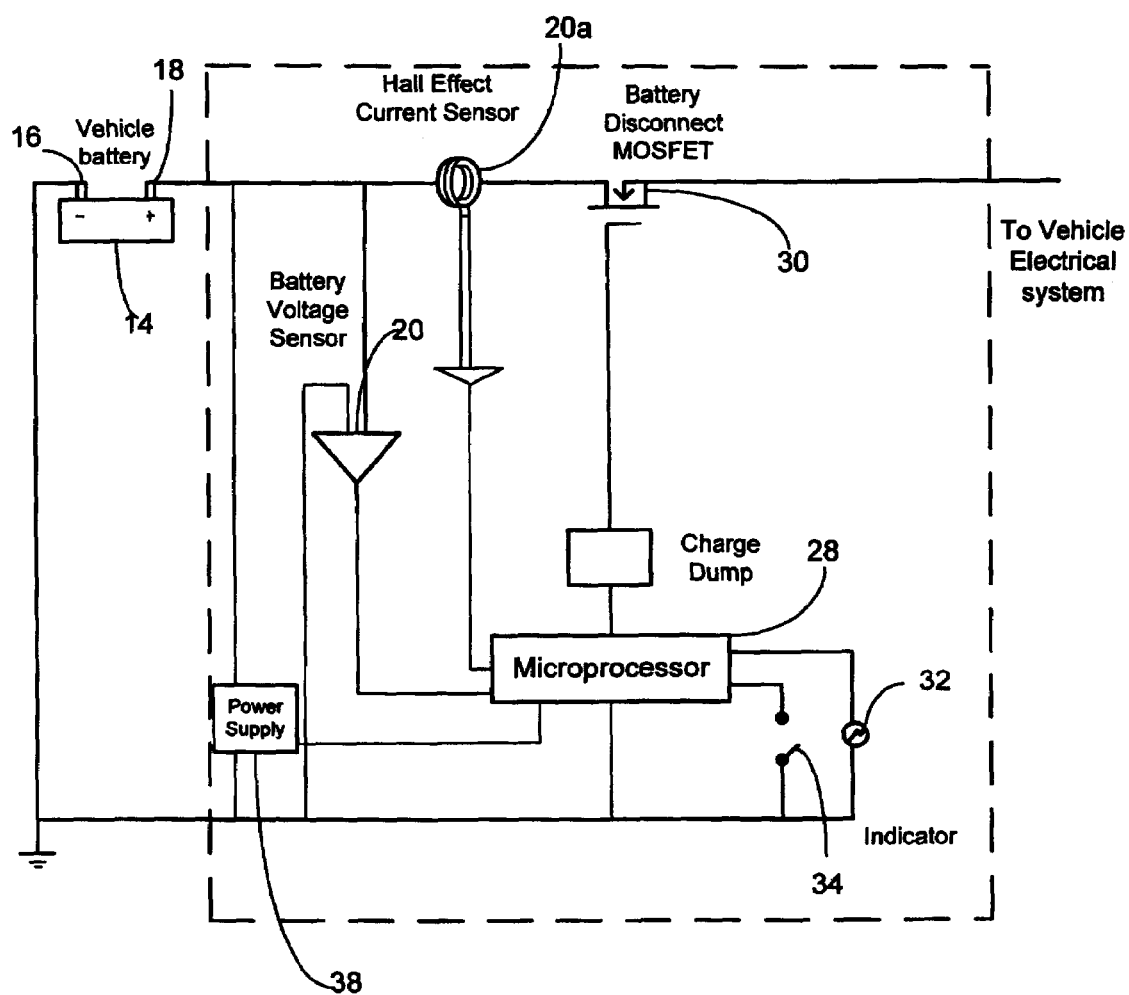
FIG. 6 is a circuit diagram of a alternate embodiment of the battery protection device of FIG. 4.

In an alternate embodiment shown in FIG. 6, the battery protection device 10 is attached to terminal 18 between the battery 14 and the vehicle electrical system. Device 10 also has an internal power supply 38 and both a voltage sensor 20 and current sensor 20a. Current sensor 20a is preferably a Hall effect current sensor. If microprocessor 28 determines that the battery charge has declined to or below a minimum starter value, the microprocessor actuates a MOSFET switch 30 that disconnects the circuit and actuates indicator 32, which is illuminated by internal power supply 38. Upon returning to the vehicle, the user can reset the device by pressing reset switch 34, which is located on battery protection device 10.

Figure 7:
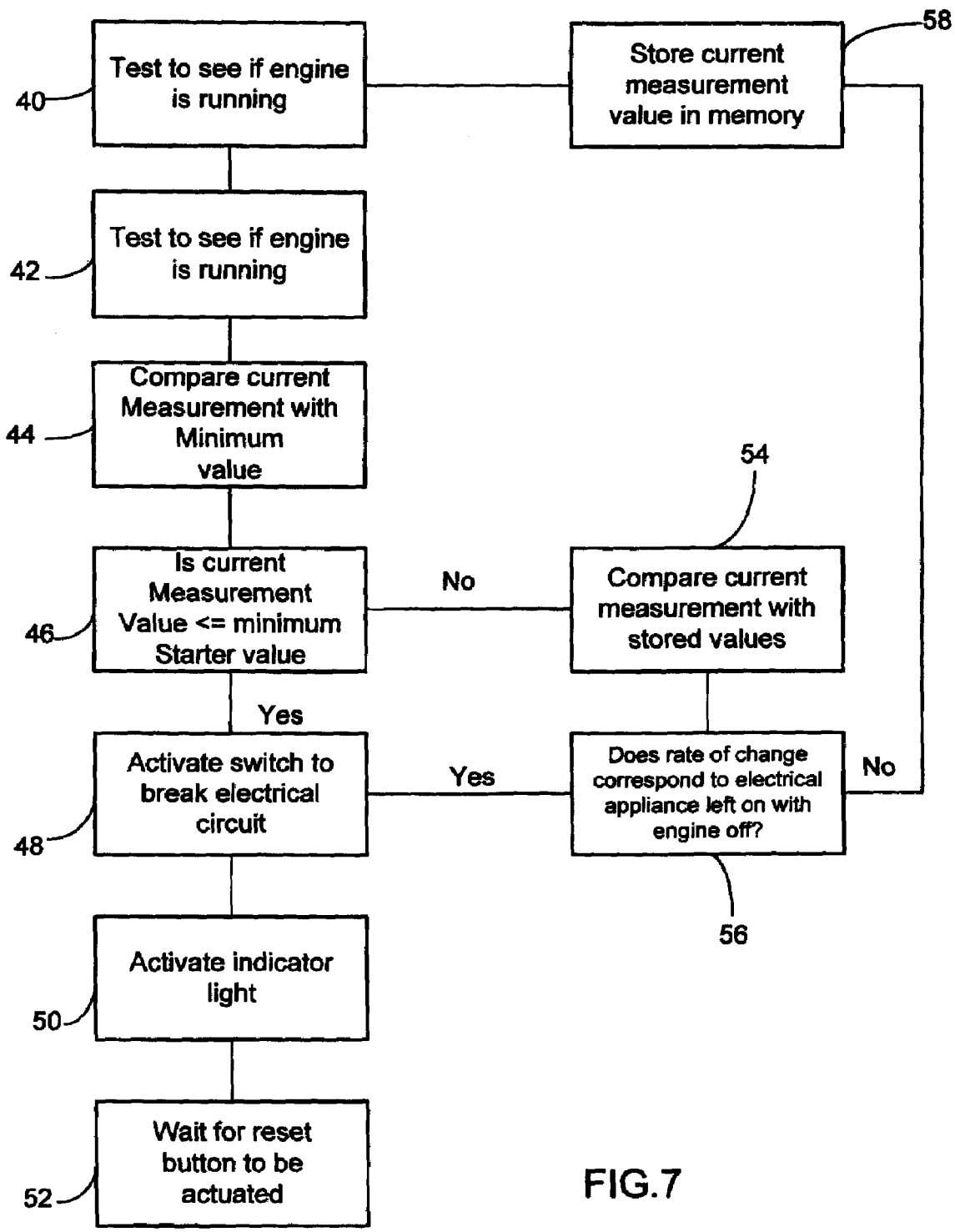
FIG. 7 is a flowchart indicating the operation of an alternate embodiment of the battery protection device.

In an another alternate embodiment shown in FIG. 7, the microprocessor 28 can also contain a memory where previous measurements are stored, and the microprocessor then compares the change in the measurements to parameters stored in a memory after the comparison of the current measurement with the minimum starter value at step 46. If the current measurement is greater than the minimum starter value, the processor then goes to step 54 where the current measurement is compared with stored measurement values. If this comparison at step 56 indicates a drop in the electrical measurements at a rate that corresponds to an electricity-using device being left on after the vehicle has been turned off, then processor cycles to step 48 and the switch 30 disconnects the battery. If not, the processor cycles to step 58 where the current electrical measurements by measuring device 22 is stored in the memory and returns to step 40. The device of this embodiment can actuate switch 30 if the electrical values were falling, even prior to the current measurement value reaching the minimum starter value. This embodiment can also use the memory to establish the minimum starter value as previously discussed.

While a particular embodiment of the present battery protection device has been described herein, it will be appreciated by those skilled in the art that changes and modifications may be made thereto without departing from the invention in its broader aspects and as set forth in the following claims.

The invention claimed is:

1. A vehicle battery protection device for preventing a vehicle battery from being drained to the point that it cannot restart a motor vehicle, the device being wired in series between the vehicle battery and the vehicle starter motor, comprising:
    at least one electrical property measuring device for measuring at least one electrical property of the electricity flowing from the battery;
    a microprocessor that compares the at least one measured electrical property with a minimum battery value, and if the comparison indicates that the electrical property measured corresponds to a situation where the vehicle engine has been left off and that the charge in the vehicle battery is less than a preset minimum starter value, the microprocessor operates a switch that opens the circuit between the starter motor and the battery and actuates an indicator notifying the vehicle operator that the device has been activated to protect the vehicle battery, said switch having a reset means to enable the circuit to be reconnected,
    wherein the minimum battery value is determined by using the electrical property measuring device to measure an average load drawn when starting the vehicle, and adding a safety margin to the measured average value.

2. The vehicle battery protection device of claim 1, where the electrical property measuring device is a voltmeter.

3. The vehicle battery protection device of claim 1, where the electrical property measuring device is a ammeter.

4. The vehicle battery protection device of claim 1, where the electrical property measuring device is a Hall effect current sensor.

5. The vehicle battery protection device of claim 1, where the indicator is located on the vehicle dashboard.

6. The vehicle battery protection device of claim 1, where the reset means is located on the vehicle dashboard.

7. The vehicle battery protection device of claim 1, where the device is attached directly to a terminal of the vehicle battery.

8. A vehicle battery protection device for preventing a vehicle battery from being drained to the point that it cannot restart the motor vehicle, the device being wired in series between the vehicle battery and the electrical system of the vehicle, comprising:
    an electrical property measuring device for measuring electrical properties of the electricity flowing through the device;
    a memory for storing past measurements of said electrical property measuring device;

a microprocessor that compares the measured electrical properties with past measurements of the electrical property measuring device stored in the memory and if the comparison indicates that the change of the electrical property measured corresponds to a situation where the vehicle engine has been left off and the current measurement indicates that the charge in the vehicle battery is less than a minimum starter value measurement, the microprocessor operates a switch that disconnects the battery from the electrical system and activates an indicator notifying the vehicle operator that the device has been actuated to protect the vehicle battery, said switch having a reset means to enable the circuit to be reconnected, wherein the minimum starter value measurement is determined by using the electrical property measuring device to measure an average load drawn when starting the vehicle, and adding a safety margin to the measured average value.

9. The vehicle battery protection device of claim 8 where the device is attached directly to a battery terminal.

10. The vehicle battery protection device of claim 8, where the microprocessor determines the minimum starter value by storing the current required by the starter from the battery at the time the vehicle is started.

11. The vehicle battery protection device of claim 10 where the device is attached directly to a battery terminal.

* * * * *